United States Patent Office 3,299,254
Patented Jan. 17, 1967

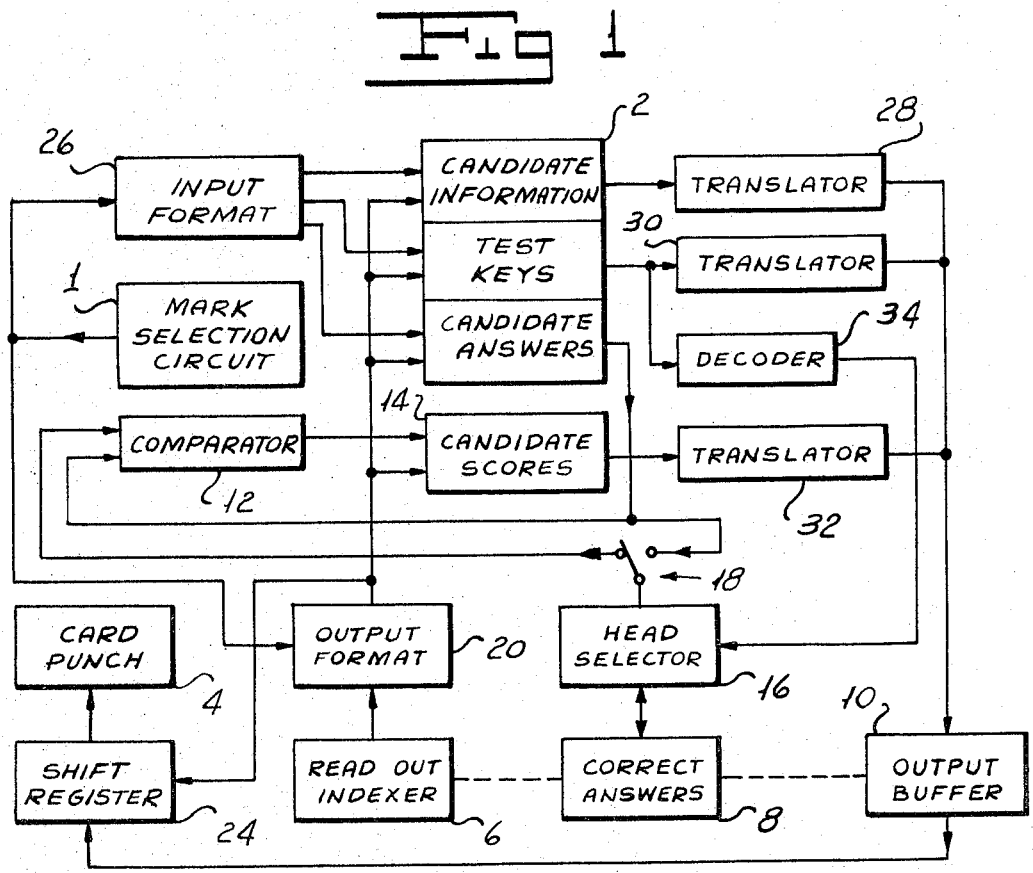

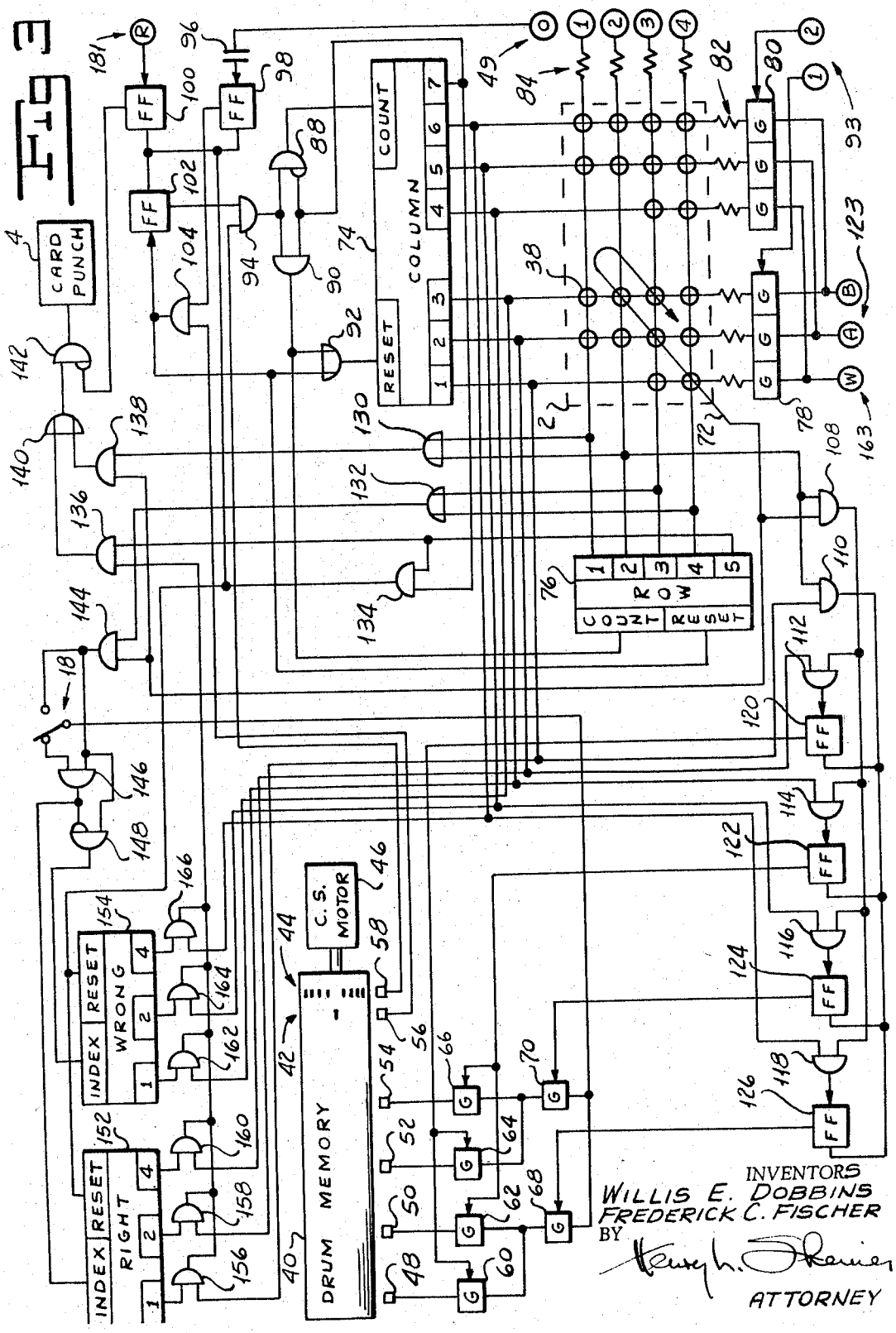

3,299,254
TEST SCORING MACHINE
Willis E. Dobbins, Manhattan Beach, and Frederick C. Fischer, Westminster, Calif., assignors to United Aircraft Corporation, East Hartford, Conn., a corporation of Delaware
Filed Aug. 21, 1961, Ser. No. 132,970
11 Claims. (Cl. 235—61.7)

Our invention relates to test scoring machines and more particularly to machines for scoring multiple-choice tests.

In the prior art, test papers have been scored by accurate mechanical registration with a master record providing the correct answers. The master record in the prior art is of the same physical dimensions as the test papers and is provided with punched holes so that the master record and the test papers may be mechanically superimposed. Thus in the prior art the comparison of correct answers and candidate answers is by mechanical registration of papers having the same physical dimensions. The requirement of precise mechanical registration imposes a severe limit on the speed with which papers may be processed. Where many thousands of test papers must be rapidly and accurately scored, test scoring machines of the prior art are too slow in processing the papers and subject to inaccuracies when precise mechanical registration is lost.

One object of our invention is to provide a test scoring machine in which an electrical image of candidate marks on a test paper is stored in a random access memory.

Another object of our invention is to provide a test scoring machine in which correct answers are stored in a drum memory for serial presentation.

A further object of our invention is to provide a test scoring machine in which candidate answers are read out from the random access memory in synchronism with the serial presentation of correct answers from the memory drum.

A still further object of our invention is to provide a test scoring machine in which electronic synchronism between the presentation of correct answers and candidate answers insures accurate and precise registration and in which a high processing speed is obtained.

Other and further objects of our invention will appear from the following description.

In general our invention contemplates the provision of a mark selection circuit as shown and described in the co-pending application of Gregory F. Conron, filed June 21, 1961, Serial No. 116,352, now Patent No. 3,201,569. The mark selection circuit indicates the resolved position of candidate marks. We further provide a random access magnetic core memory which stores an electrical image of resolved candidate marks on a test paper. In a constantly rotating drum memory we store the correct answers. The memory drum is provided with an indexer which indicates the angular position of the drum. This indexer controls the order of read out of the core memory. The correct answers are serially presented from the drum memory. Simultaneously, the drum indexer causes the core memory to present corresponding candidate answers. The electronically synchronized signals from the core and drum memories are then compared to indicate right, wrong, and omitted answers.

In the accompanying drawings which form part of the instant specification and which are to be read in conjunction therewith and in which like reference numerals are used to indicate like parts in the various views:

FIGURE 1 is a block diagram of our test scoring machine.

FIGURE 2 is a view showing an unmarked and simplified test paper.

FIGURE 3 is a simplified schematic view in accordance with FIGURE 1 of a machine for scoring the test paper shown in FIGURE 2.

More particularly referring now to FIGURE 1, the mark selection circuit 1, shown in the aforementioned copending application, is coupled to an input format control 26 and an output format control 20. The input format control 26 imposes the outputs of mark selection circuit 1 on various sections of a random access core memory 2. Core memory 2 provides storage of candidate information, of test keys, and of candidate answers. A constantly rotating magnetic drum is provided with tracks for a read-out indexer 6, the correct answers 8, and an output buffer 10. The tracks 6, 8, and 10 of the magnetic drum are shown as being mechanically coupled for synchronous rotation. Read-out indexer 6 is coupled through the output format control 20 to the candidate information cores, the test key cores, and the candidate answer cores of memory 2, to a candidate score storage register 14, and to a shift register 24. The output of the candidate information cores of memory 2 is coupled to a translator 28. The output of the test key cores of memory 2 is coupled to a translator 30 and to a decoder 34. The output of the candidate answer cores of memory 2 is coupled to one input of a comparator 12 and to one contact of a single-pole, double-throw, READ-WRITE switch indicated generally by the reference numeral 18. The output of decoder 34 is coupled to a head selector 16 which enables one of a plurality of heads associated with a plurality of tracks representing the correct answers 8, where provision is made for a plurality of test keys. With switch 18 in the position shown, the output of a reading head is coupled to the armature of switch 18 and then to the other input of comparator 12. The output of comparator 12 is coupled to a device 14 which stores candidate scores. The output of storage device 14 is coupled to a translator 32. The output of translators 28, 30 and 32 are coupled to an input writing head associated with buffer track 10. An output reading head associated with buffer track 10 is coupled to the shift register 24. The output of shift register 24 is coupled to a card punch 4.

In operation of FIGURE 1, the outputs of mark selection circuit 1 are distributed to the appropriate sections of memory 2 by the input format control 26. After the scanning of candidate marks on a test paper there is stored in memory 2 an electrical image of the resolved position of candidate marks. Memory 2 is loaded up as rapidly as the scanning drum of mark selection circuit 1 can handle an answer paper. Mark selection circuit 1 then enables the output format control 20 to respond to the read-out indexer 6. The test key cores of memory 2 must be read out before the candidate answer cores of memory 2. The candidate information cores of memory 2 may be read out at any time. The reading of the test key cores of memory 2 is stored in decoder 34 which causes head selector 16 to enable a correct answer track 8 corresponding to the test key. In the position of switch 18 shown, correct answers 8 are serially presented to the comparator 12. The candidate answer cores of memory 2 are synchronously interrogated by read-out indexer 6 and couple corresponding signals to comparator 12. Comparator 12 actuates accumulators for right, wrong, and omitted answers to store candidate scores 14. Upon the completion of the synchronous comparison of candidate answers and correct answers, the read-out indexer 6 transmits the accumulated candidate scores 14 through translator 32 to the input writing head of buffer track 10. Translators 28, 30 and 32 are employed to change the form of information from that compatible with multiple-choice tests to that which may be accommodated by the card punch 4. Upon buffer track 10 are recorded candidate information, test keys, and candidate scores corresponding to the various test keys. Read-out indexer 6 now causes the output format control 20 to enable shift register 24 to respond to the output reading head of buffer track 10. Shift register 24 provides parallel storage which is compatible with the usual card punch 4. The outputs of shift register 24 cause car punch 4 to generate a permanent record of the identification of the candidate, the tests taken, and the scores obtained in such tests.

With switch 18 in the READ position shown, the information previously stored in correct answer tracks 8 is read and presented to comparator 12 as previously described. Upon the actuation of switch 18 to the WRITE position, the information in the candidate answer cores of memory 2 is used to write the correct answers in tracks 8. This is accomplished by preparing a number of answer papers each having a different test key and the correctly marked answers corresponding to each test key. Mark selection circuit 1 produces an image in memory 2 both of the particular test key and of the correct answers. The interrogation of the test key cores by read-out indexer 6 causes decoder 34 to select the appropriate head 16. Since read-out indexer 6 controls the interrogation of the candidate answer cores (now the correct answer cores, in the WRITE position of switch 18), accurate registration between the read-out indexer 6 and the correct answer tracks 8 is secured.

Referring now to FIGURE 2, the test paper 17 is provided with four rows having corresponding row marks 41 as described in the aforementioned copending application. Each of the four rows is provided with four columns of marking positions in two groups of two each. Each group of two marking positions comprises an item. In each row there are two items each having two marking positions which are lettered A and B. Paper 17 is provided with spaces in which the candidate may write his name and his seat. The candidate encodes his seat by placing one mark in each of the two items of the first row. The candidate selects the particular test he wishes to take, writes the name of the test in the box provided, and encodes the test key by placing one mark in each of the two items of the second row. The test is provided with answer items 1 through 4 in the third and fourth rows.

In the mark selection circuit of the aforementioned copending application, the row counter 49 counts ten rows; the item counter 93 counts three items; and the multiple gates 123 provide three resolved mark positions. For the simple test sheet we have shown in FIGURE 2 however, row counter 49 need count only four rows instead of ten; item counter 93 need count only two items instead of three; and multiple gates 123 need provide only two resolved mark positions instead of three. Referring now to FIGURE 3, the 0, 1, 2, 3, and 4 outputs of the row counter are indicated generally by the reference numeral 49; the 1 and 2 outputs of the item counter are indicated generally by the reference numeral 93; and the A and B resolved mark position outputs of the multiple gates are indicated generally by the reference numeral 123. The W output from the wrong answer AND circuit is indicated generally by the reference numeral 163; and the R output from the paper shunting AND circuit is indicated generally by the reference numeral 181. The W output 163 indicates an answer which is wrong because of multiple guessing; and the R output 181 indicates that a paper is to be shunted aside for manual processing and that previously stored information from such paper is to be cleared, as shown and described in the aforementioned co-pending application.

We provide a row indexer 76 which generates the outputs 1, 2, 3, 4, and 5. The 1 output of row counter 49 is coupled to the 1 output of row indexer 76 through the core memory 2. The core memory 2 is provided with at least twenty cores 38. The 2, 3, and 4 outputs of row counter 49 are coupled through the core memory 2 to the 2, 3, and 4 outputs respectively of the row indexer 76. We provide four row resistors indicated generally by the reference numeral 84 in series with the respective row connections through the core memory 2 to regulate the flow of magnetizing current through cores 38. We provide a column indexer 74 which generates the outputs 1, 2, 3, 4, 5, 6, and 7. We provide a first multiple gate circuit 78 and a second multiple gate circuit 80. The W output 163 and the A and B outputs 123 are connected through respective gates 78 and then through the core memory 2 to the 1, 2, and 3 outputs of column indexer 74. The W output 163 and the A and B outputs 123 are also connected through respective gates 80 and then through the core memory 2 to the 4, 5, and 6 outputs of column indexer 74. We provide six column resistors indicated generally by the reference numeral 82 in series with the respective column connections through the core memory 2 to regulate magnetizing current flow. The 1 output of item counter 93 is connected to the control input of multiple gates 78; and the 2 output of item counter 93 is connected to the control input of multiple gates 80. The core memory matrix 2 may have twenty-four cores; but of these, only the twenty cores 38 necessary for operation have been shown. The read-out winding 72, which is only partially shown, diagonally threads every core 38 as will be appreciated by those ordinarily skilled in the art. The 1 and 2 outputs of row indexer 76 are connected to the inputs of an OR circuit 130. The 3 and 4 outputs of row indexer 76 are connected to the inputs of an OR circuit 132. The 5 output of row indexer 76 is connected to one input of each of AND circuits 134 and 136. The 7 output of column indexer 74 is connected to the other input of AND circuit 134 and to one input of an AND circuit 90. The 7 output of column indexer 74 is inverted and applied to one input of an AND circuit 88. The 2 output of row indexer 76 is connected to one input of each of AND circuits 108 and 110. The read-out winding 72 of the core memory is connected to the other input of AND circuit 108 and to one input of each of AND circuits 144 and 138. The 1 output of column indexer 74 is connected to the other input of AND circuit 110. The output of OR circuit 130 is connected to the other input of AND circuit 138. The output of OR circuit 132 is connected to the other input of AND circuit 144. A drum memory 40, continuously driven by a constant speed motor 46, is provided with read-out indexer tracks indicated generally by the reference numerals 42 and 44. Track 44 has at least thirty-five discrete magnetic marking positions only one of which is vacant. Track 42 contains only one magnetic mark which is aligned with the vacant marking position of track 44. Reading heads 56 and 58 cooperate with respective tracks 42 and 44. The output of reading head 56 is coupled to one input of an AND circuit 104. The output of reading head 58 is coupled to one input of an AND circuit 94. We provide bistable flip-flops 98, 100, and 102. The 0 output of row counter 49 is connected through a capacitor 96 to the setting input of flip-flop 98. The output of flip-flop 98 is connected to the other input of AND circuit 104. The output of AND circuit 104 is connected to the setting input of flip-flop 102, to one input of an OR circuit 92, and to the reset input of row indexer 76. The output of flip-flop 102 is connected to the other input of AND circuit 94. The output of AND circuit 94 is connected to the other input of each of AND circuits 88 and 90. The output of AND circuit 88 is connected to the counting input of column indexer 74. The output of AND circuit 90 is connected to the other input of OR circuit 92 and to the counting input of row indexer 76. The output of OR circuit 92 is connected to the reset input of column indexer 74. The output of AND circuit 108 is connected to one input of each of the decoder AND circuits 112, 114, 116, and 118. The 2, 3, 5, and 6 outputs of column indexer 74 are connected to the other input of decoder AND circuits 112, 114, 116, and 118 respectively. The output of AND circuit 110 is connected to the resetting input of each of bistable decoder flip-flops 120, 122, 124, and 126. The outputs of decoder AND circuits 112, 114, 116, and 118 are connected respectively to the setting inputs of decoder flip-flops 120, 122, 124, and 126. We provide a plurality of axially spaced heads 48, 50, 52, and 54 associated with various correct answer tracks of the drum memory 40. Heads 48 and 50 are coupled through respective selector gates 60 and 62 and then through selector gate 68 to the armature of READ-WRITE switch 18. Heads 52 and 54 are coupled through respective selector gates 64 and 66 and then through selector gate 70 to the armature of switch 18. The outputs of decoder flip-flops 124 and 126 are connected to the control inputs of head selector gates 70 and 68, respectively. The output of decoder flip-flop 122 is connected to the control input of each of head selector gates 62 and 66; and the output of decoder flip-flop 120 is connected to the control input of each of head selector gates 60 and 64. The number of right answers is indicated by a binary counter 152 which provides the binary-coded outputs 1, 2, and 4. The number of wrong answers is inidcated by a binary counter 154 which likewise provides the binary-coded outputs 1, 2, and 4. The 1, 2, and 4 outputs of right answer counter 152 are respectively connected to one input of AND circuits 156, 158, and 160. The 1, 2, and 4 outputs of wrong answer counter 154 are connected respectively to one input of AND circuits 162, 164, and 166. The 1, 2, 3, 4, 5, and 6 outputs of column indexer 74 are connected respectively to the other input of AND circuits 156, 158, 160, 162, 164, and 166. The outputs of AND circuits 156 through 166 are all connected to the other input of AND circuit 136. The six AND circuits 156 through 166 may each comprise a junction transistor providing a collector output. The high impedance collector outputs may be directly connected, as shown, without adverse loading effect, thereby eliminating the need of employing a six input OR circuit for purposes of isolation. The output of AND circuit 136 is connected to one input of an OR circuit 140. The output of AND circuit 138 is connected to the other input of OR circuit 140. The R output 181 is connected to the setting input of flip-flop 100. The output of flip-flop 100 is inverted and applied to one input of an AND circuit 142. The output of OR circuit 140 is connected to the input of AND circuit 142. The output of AND circuit 142 is coupled to the card punch 4. One contact of switch 18 is connected to one input of a comparator AND circuit 146. The output of AND circuit 144 is connected to the other input of comparator AND circuit 146, to the other contact of switch 18, and to one input of a comparator AND circuit 148. The output of comparator AND circuit 146 is connected to the index input of right answer counter 152 and is inverted and applied to the other input of comparator AND circuit 148. The output of comparator AND circuit 148 is connected to the index input of wrong answer counter 154. The output of AND circuit 134 is connected to the resetting input of right answer counter 152, wrong answer counter 154, and flip-flops 98, 100, and 102.

In operation of FIGURE 3 the core memory 2 stores candidate information in the first row. The test key is stored in the second row of core memory 2; and candidate answers are stored in the third and fourth rows of memory 2. Core memory 2 of FIGURE 3 is provided with four additional cores 38 which do not correspond to marking positions on the test paper 17 of FIGURE 2. These four additional cores are located in the first and fourth columns of the third and fourth rows of memory 2, and are used to indicate multiply-marked answer items. As will be described hereinafter during the scanning of the test paper by the mark selection circuit, row indexer 76 provides a 5 output while the 1, 2, 3, and 4 terminals rest at ground. Furthermore, the column indexer 74 provides a 7 output while the 1, 2, 3, 4, 5, and 6 terminals rest at ground. Thus row indexer 76 and column indexer 74 provide ground return connections for inputs to the core memory 2 from row counter 49 and for column inputs from multiple gates 78 and 80. As will be described hereinafter, each of cores 38 is initially reset with a predetermined polarity of magnetization. During the scanning of the test paper, row counter 49 successively provides 1, 2, 3, and 4 outputs. Each of these outputs tends to reverse the polarity of magnetization of cores 38 and thus tends to set the cores.

During the scanning of each of the rows of the test paper by the mark selection circuit, the 1 and 2 outputs of item counter 93 successively actuate multiple gates 78 and 80. Immediately upon the completion of the scanning of the first item in each of the first and second rows of the test paper, multiple gates 123 generate either an A or B mark position output which is coupled through multiple gates 78 to the core memory. Immediately upon the completion of the scanning of the second item in each of the first and second rows of the test paper, multiple gates 123 generate either an A or B output mark position output which is now coupled through multiple gates 80 to the core memory. Immediately upon the completion of the scanning of the first item in each of the third and fourth rows of the test paper, multiple gates 123 and AND circuit 163 provide either an A, B, or W output which is coupled through multiple gates 78 to the core memory 2. Immediately upon the completion of the scanning of the second item in each of the third and fourth rows of the test paper, multiple gates 123 and AND circuit 163 provide either an A, B, or W output which is now coupled through multiple gates 80 to the core memory 2. The column inputs to the core memory 2 through multiple gates 78 and 80 also tend to reverse the initial polarity of magnetization of cores 38 and thus tend to set the cores. An input from row indexer 49 is not alone sufficient to set any core 38, nor is a column input from multiple gates 78 and 80. The combination of an input from row indexer 49 and a column input from multiple gates 78 and 80, however, is sufficient to set that core at the matrix intersection. Thus at the completion of the scanning of the test paper by the mark selection circuit there is stored in core memory 2 a modified electrical image of the resolved position of candidate marks. The four additional cores at the intersections of the first and fourth columns with the third and fourth rows store indications of answers which are wrong because of multiple guessing by the candidate. These four additional answer item cores have no corresponding marking position on the test paper 17 of FIGURE 2.

When paper 17 leaves the scanning drum of the mark selection circuit, row counter 49 is reset to 0. The 0 output from row counter 49 is differentiated by capacitor 96 and sets flip-flop 98. Flip-flop 98 now provides an output enabling AND circuit 104 to respond to reading head 56 of track 42. Constant speed motor 46 continuously drives memory drum 40. The single magnetic mark of track 42 produces a pulse in reading head 56 once each revolution. The pulse in reading head 56 is now coupled through AND circuit 104, setting flip-flop 102 and resetting row indexer 76 to 1. The output of AND circuit 104 also resets column indexer 74 to 1 through OR circuit 92. Flip-flop 102 now provides an output which enables AND circuit 94 to respond to reading head 58 of track 44. Signals from reading head 58 produced by track 44 now cause the column and row indexers, 74 and 76, to interrogate serially the cores 38 of memory 2. During interrogation of memory 2, row counter 49 provides a 0 output while the 1, 2, 3, and 4 terminals rest at ground. Row counter 49 and multiple gates 78 and 80 provide ground return connections for inputs to memory 2 from row and column indexers 76 and 74. In the absence of a 7 output from column indexer 74, AND circuit 90 is disabled; and AND circuit 88 is enabled to respond to AND circuit 94. The first six magnetic marks of track 44 produce corresponding pulses in reading head 58 which are coupled through AND circuits 94 and 88 to the counting input of column indexer 74, stepping column indexer 74 successively to 2, 3, 4, 5, 6, and 7. The 7 output from column indexer 74 disables AND circuit 88 and enables AND circuit 90. The seventh magnetic mark of track 44 produces a pulse in reading head 58 which is coupled through AND circuit 94 and now through AND circuit 90 to increase the count of the row indexer 76 to 2. The output of AND circuit 90 also resets column indexer 74 to 1 through OR circuit 92. The resetting of the column indexer 74 to 1 disables AND circuit 90 and enables AND circuit 88. The eighth through thirteenth magnetic marks of track 44 successively step column indexer 74 from 1 through 7. The fourteenth magnetic mark of track 44 resets column indexer 74 to 1 and simultaneously increases the count of row indexer 76 to 3. The fifteenth through twentieth magnetic marks of track 44 step column indexer 74 from 1 through 7. The twenty-first magnetic mark of track 44 resets column indexer 74 to 1 and increases the count of row indexer 76 to 4. The twenty-second through twenty-seventh magnetic marks of track 44 cause column indexer 74 to count successively from 1 through 7. The twenty-eighth magnetic mark of track 44 resets column counter 74 to 1 and increases the count of row indexer 76 to 5. The twenty-ninth through thirty-fourth magnetic marks of track 44 cause column indexer 74 to count from 1 through 7. With a 5 output from row indexer 76 and a 7 output from column indexer 74, AND circuit 134 produces a signal which resets flip-flops 98 and 102. The resetting of flip-flop 98 disables the response of AND circuit 104 to the single magnetic mark of track 42. The resetting of flip-flop 102 disables the response of AND circuit 94 to any of the thirty-four magnetic marks of track 44. The count of both the row and column indexers 76 and 74 remains constant until a subsequent answer paper 17 enters and leaves the scanning drum of the mark selection circuit whereupon row counter 49 is again reset to 0 and provides a pulse through capacitor 96 which sets flip-flop 98.

During the serial interrogation of core memory 2 by row and column indexers 76 and 74, the flow of current is reversed from that during image storage in response to row inputs from counter 49 and column inputs from multiple gates 78 and 80. The serial interrogation of cores 38 resets the magnetic flux to its original polarity, the interrogation being destructive and clearing memory 2 of all previously stored information. For those cores 38 which are set during image storage, then interrogation and consequent resetting of such cores will produce pulses from read-out winding 72 due to reversal of magnetization. It will be noted that no cores need be provided for the first and fourth columns of the first and second rows since multiply marked candidate information items and test key items will result in an R output 181. In the absence of a paper shunting R output 181, flip-flop 100 provides no output. The absence of output from flip-flop 100 enables AND circuit 142. During the interrogation of the first and second rows of core memory 2, the 1 and 2 outputs of row indexer 76 are coupled through OR circuit 130 enabling AND circuit 138. Thus pulses from read-out winding 72 are coupled through AND circuit 138, through OR circuit 140, and through AND circuit 142 to the card punch 4. The card punch 4 provides a permanent recording of candidate information and test key items located respectively in the first and second rows of memory 2.

It will be recalled that no core need correspond to the first column of the second row of memory 2 since a multiply marked test key item produces a paper shunting R output 181. This interval, corresponding to the seventh magnetic mark of track 44, is used to reset decoder flip-flops 120 through 126 in preparation for the storage of the new test key contained in the remaining columns 2 through 6 of the second row of core memory 2. For a 2 output from row indexer 76 and a 1 output from column indexer 74, AND circuit 110 couples a signal to the resetting terminal of flip-flops 120, 122, 124, and 126. The 2, 3, 5, and 6 outputs from column indexer 74, sequentially enable decoder AND circuits 112, 114, 116, and 118. During the interrogation of the second row of core memory 2, the 2 output of row indexer 76 enables AND circuit 108. Thus pulses from readout winding 72 during the interrogation of the second row of memory 2 are coupled through AND circuit 108 and sequentially through two of the four decoder AND circuit 112 through 118 to set two of the four decoder flip-flops 120 through 126.

Decoder flip-flops 120 through 126 store the test key and cause head selector gates 160 through 170 to enable one of the four heads 48 through 54. The setting of flip-flops 126 and 120 enables head 48 through gates 68 and 60; flip-flops 126 and 122 enable head 50 through gates 68 and 62; flip-flops 124 and 120 enable head 52 through gates 70 and 64; and the setting of flip-flops 124 and 122 enables head 54 through gates 70 and 66.

During the interrogation of the candidate answer items in the third and fourth rows of memory 2, the 3 and 4 outputs from row indexer 76 are coupled through OR circuit 132, enabling AND circuit 144 to respond to pulses from read-out winding 72. The correct answer track of drum memory 40 associated with that head 48 through 54 which is selected by gates 60 through 70 produces pulses which are coupled to the armature of switch 18. In the READ position of switch 18 shown, the correct answer pulses are coupled to one input of comparator AND circuit 146. Candidate answer pulses from read-out winding 72 are coupled through AND cricuit 144 to the other input of comparator AND circuit 146. If a correct answer pulse from drum memory 40 coincides with a candidate answer pulse from AND circuit 144, then comparator AND circuit 146 produces an output pulse which indexes the right answer counter 152. Each candidate answer pulse from AND circuit 144 is coupled to comparator AND circuit 148. However, a pulse from comparator AND circuit 146, indicating a right answer, disables comparator AND circuit 148 and prevents the indexing of wrong answer counter 154. If a candidate answer pulse appears at read-out winding 72 and no corresponding correct answer pulse is generated from drum memory 40, then comparator AND circuit 146 provides no output. The absence of output from comparator AND circuit 146 enables comparator AND circuit 148. Thus a candidate answer pulse from AND circuit 144 is coupled through comparator AND circuit 148 to index the wrong answer counter 154. It will be seen that each candidate answer pulse from AND circuit 144 causes indexing of the wrong answer counter 154 unless there simultaneously occurs a correct answer pulse from drum memory 40. The simultaneous occurrence of a correct answer pulse from drum memory 40 and a candidate answer pulse from AND circuit 144 indexes the right answer counter 152. Since the four additional cores in the first and fourth columns of the third and fourth rows of memory 2 have no corresponding marking position on the test paper 17, the setting of any of these four cores by a W input 163 will always result in the indexing of wrong answer counter 154 when such cores are reset during interrogation.

After interrogation of the third and fourth rows of memory 2, there may be as many as four right answers or four wrong answers. We have shown counters 152 and 154 as providing the binary counts 1, 2, and 4. As will be appreciated by those skilled in the art, this affords a maximum count of seven, which is more than sufficient to accommodate the storage of a count of four right or wrong answers. In order to simplify the circuit of FIGURE 3, the omitted answers counter of candidate score accumulators 14 of FIGURE 1 have not been shown in detail.

The twenty-eighth magnetic mark of track 44 causes the count of row indexer 76 to increase to 5. The 5 output of row indexer 76 enables AND circuit 136 to couple the accumulated candidate scores stored in counters 152 and 154 to the card punch 4. The 1, 2, 3, 4, 5, and 6 outputs from column indexer 74 successively enable AND circuits 156, 158, 160, 162, 164, and 166. Thus the outputs of the right and wrong answer counters 152 and 154 are coupled through AND circuit 136, OR circuit 140, and AND circuit 142 to card punch 4. Card punch 4 provides a permanent record of the accumulated candidate scores as well as the identification of the candidate and the test taken.

If, during the scanning of test paper 17 by the mark selection circuit, a paper shunting R output 181 is produced for any reason, then flip-flop 100 is set. The setting of flip-flop 100 disables AND circuit 142 so that no signals may be coupled to the card punch 4. It will be appreciated that if paper 17 is to be shunted for any reason, then the R output 181 will be generated before paper 17 leaves the scanning drum of the mark selection circuit. Accordingly, the R output 181 appears before row counter 49 is reset to 0; and AND circuit 142 is disabled before interrogation of memory 2.

Whether or not there is present the paper shunting R output 181, the serial interrogation of core memory 2 resets all cores 38 to their initial state of magnetization. With a 5 output from row indexer 76 and a 7 output from column indexer 74, AND circuit 134 couples a resetting signal to flip-flops 98 and 102 which, as previously described, causes the row and column indexers 76 and 74 to retain their respective 5 and 7 outputs. The signal from AND circuit 134 also resets flip-flop 100 and further resets both the right-answer counter 152 and the wrong-answer counter 154 to zero.

In FIGURE 3 as in FIGURE 1, switch 18 is shown in the READ position, where correct answers are read from drum memory 40 for presentation to comparator AND circuit 146. When switch 18 is actuated to the WRITE position, the outputs of AND circuit 144 are written into the various correct answer tracks of drum memory 40. Head selector gates 60 through 70 should thus be of a bilateral type which can couple signals in either direction. In the test paper 17 of FIGURE 2, only the test key in the second row and the proper answers in the third and fourth rows need be manually marked. Since the candidate information items in the first row are omitted, the mark selection circuit will generate an R output 181, setting flip-flop 100, disabling AND circuit 142, and preventing the actuation of card punch 4. The second, third, and fourth rows of core memory 2 are loaded with an image of the test key and the proper answers in response to row counter 49, item counter 93, and the A and B outputs of multiple gates 123 of the mark selection circuit. Again heads 56 and 58 of read-out indexer tracks 42 and 44 are activated by the 0 output of row counter 49 when paper 17 leaves the scanning drum of the mark selection circuit. Again row and column indexers 76 and 74 serially interrogate the various cores 38 of memory 2. Again decoder flip-flops 120 through 126 are reset by AND circuit 110 for a 2 output from row indexer 76 and a 1 output from column indexer 74. Two of the decoder flip-flops 120 through 126 are set in accordance with the test key stored in the second row of memory 2 by decoder AND circuits 112 through 118. The setting of decoder flip-flops 120 through 126 causes selector gates 60 through 70 to enable one of the heads 48 through 54 associated with the various correct answer tracks of drum memory 40. The proper answers stored in the third and fourth rows of memory 2 are sequentially coupled through AND circuit 144 to the selected one of reading heads 48 through 54. Since the interrogation of the proper answer cores in the third and fourth rows of memory 2 is controlled by read-out indexer track 44, accurate registration between indexer track 44 and the correct answer tracks of drum 40 is secured.

In order to simplify the circuit of FIGURE 3, the output buffer track 10 on drum 40, the shift register 24, and translators 28, 30, and 32 of FIGURE 1 have not been shown in detail. Furthermore, the input format 26 and the output format 20 of FIGURE 1 are shown permanently incorporated into the wiring connections and circuitry of FIGURE 3. Thus in FIGURE 3 the input and output formats are fixed and not readily changeable as in FIGURE 1. It will be recalled that output buffer track 10 on drum 40 and shift register 24 are provided in FIGURE 1 for accommodation of card punch 4. As will be appreciated by those skilled in the art, it may be desirable in FIGURE 3 to provide connections between column indexer 74 and card punch 4 to synchronize and index externally the card punch if it is not of a self-indexing type.

It will be seen that we have accomplished the objects of our invention. We have provided a test scoring machine in which a modified electrical image of candidate answers on test paper 17 is stored in core memory 2. Correct answers are stored in drum memory 40 for serial presentation. In out test scoring machine candidate answers are read out from core memory 2 in synchronization with the serial presentation of correct answers from drum memory 40. Since precise registration between candidate answers and correct answers is automatically secured, our test scoring machine can accurately score many thousands of test papers each hour.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A test scoring machine including in combination a random access memory, means for storing candidate answers in the random access memory, means including a rotating memory for serially presenting correct answers, and means for serially interrogating the random access memory synchronously with the presentation of correct answers.

2. A test scoring machine including in combination a random access memory, means for storing candidate answers in the random access memory, means including a rotating memory for serially presenting correct answers, and means including indexing means rotating in unison with the rotating memory for serially interrogating the random access memory synchronously with the presentation of correct answers.

3. A test scoring machine including in combination a magnetic core memory, means for storing candidate answers in the core memory, means including a rotating magnetic drum memory for serially presenting correct answers, and means including indexing means rotating in unison with the drum memory for serially interrogating the core memory synchronously with the presentation of correct answers.

4. A test scoring machine including in combination a signal channel, means for serially presenting pulses representing resolved candidate answers to the signal channel, means for serially providing correct answer pulses synchronously with the presentation of resolved candidate answer pulses, means for serially presenting to the signal channel further pulses indicating answers which are to be scored wrong, an accumulator for wrong answers, and means actuating the wrong answer accumulator for each signal channel pulse which is not accompanied by a concurrent correct answer pulse.

5. A test scoring machine including in combination a test paper having provision for a test key, means for decoding the test key, means for storing a plurality of groups of correct answers, means for serially presenting candidate answers, and means responsive to the decoding means for serially providing the stored correct answers of one of the groups synchronously with the persentation of candidate answers.

6. A test scoring machine including in combination a test paper having provision for a test key, means for decoding the test key, means for storing a plurality of groups of correct answers, and means responsive to the decoding means for serially presenting the stored correct answers of one of the groups.

7. A test scoring machine including in combination a test paper having provision for a test key, means for storing the test key and resolved representations of candidate answers, a decoder, means for presenting the stored test key to the decoder, a signal channel, means including rotating indexing means for serially presenting to the signal channel pulses in accordance with the stored representations of resolved candidate answers, means responsive to the decoder and including storage means rotating in unison with the indexing means for providing one of a plurality of sequences of correct answer pulses synchronously with the presentation of resolved candidate answer pulses, means for serially presenting to the signal channel further pulses indicating answers which are to be scored wrong, an accumulator for wrong answers, and means responsive to a signal channel pulse for actuating the wrong answer accumulator in the absence of a concurrent correct answer pulse.

8. A test scoring machine including in combination a test paper having provision for candidate answers, means responsive to candidate answers for providing resolved representations thereof, means for storing the resolved representations, means for serially presenting the stored representations, and means for serially providing correct answers synchronously with the presentation of the stored representations of resolved candidate answers.

9. A machine for scoring a test paper having provision for candidate answers including in combination means responsive to candidate answers for providing resolved representations thereof, means for serially presenting pulses in accordance with said resolved representations, means for serially providing correct answer pulses synchronously with the presentation of resolved candidate answer pulses, an accumulator for wrong answers, and means actuating the accumulator for each candidate answer pulse which is not accompanied by a concurrent correct answer pulse.

10. A machine for scoring a test paper having provision for candidate answers including in combination means for reading the candidate answers, a random access memory, means responsive to the reading means for storing candidate answers in the memory, means for interrogating the memory, and means responsive to the interrogating means for determining candidate scores.

11. A machine for scoring a test paper having provision for candidate answers including in combination means responsive to candidate answers for providing resolved representations thereof, a random access memory, means for storing the resolved representations in the memory, means for interrogating the memory, and means responsive to the interrogating means for determining candidate scores.

References Cited by the Examiner

UNITED STATES PATENTS

| | | | |
|---|---|---|---|
| 2,944,734 | 7/1960 | Martin | 235—61.7 |
| 3,000,556 | 9/1961 | Bewley et al. | 235—61.6 |
| 3,050,248 | 8/1962 | Lindquist | 235—61.7 |
| 3,229,257 | 1/1966 | Lubkin | 340—172.5 |

MAYNARD R. WILBUR, *Primary Examiner.*

WALTER W. BURNS, JR., *Examiner.*

R. E. COUNCIL, D. M. ROSEN, *Assistant Examiners.*